United States Patent [19]

Takahashi et al.

[11] 4,433,901

[45] Feb. 28, 1984

[54] ALL SOLID TYPE ELECTROCHROMIC DISPLAY ELEMENT

[75] Inventors: Yosuke Takahashi, Sagamihara; Hideki Akasaka, Yokohama; Toshikatsu Kasui, Tokyo; Tatsuo Niwa; Tsuneo Sukegawa, both of Kawasaki, all of Japan

[73] Assignee: Nippon Kogaku K.K., Tokyo, Japan

[21] Appl. No.: 268,683

[22] Filed: Jun. 1, 1981

[30] Foreign Application Priority Data

Jun. 19, 1980 [JP] Japan ................................. 55-82109

[51] Int. Cl.³ .............................................. G02F 1/17
[52] U.S. Cl. ..................................... 350/357; 340/785
[58] Field of Search ..................... 350/357, 353, 355; 340/785

[56] References Cited

U.S. PATENT DOCUMENTS

| | | | |
|---|---|---|---|
| 3,995,943 | 12/1976 | Jasinski | 350/357 |
| 4,060,311 | 11/1977 | Green | 350/357 |
| 4,253,742 | 3/1981 | Morita | 350/357 |
| 4,335,938 | 6/1982 | Giglia et al. | 350/357 |

FOREIGN PATENT DOCUMENTS 52-73749  6/1977  Japan .................................. 350/357

Primary Examiner—James W. Davie
Attorney, Agent, or Firm—Fitzpatrick, Cella, Harper & Scinto

[57] ABSTRACT

An improvement in an all solid type electrochromic display element comprising a first electrode, a first oxidation-reduction reaction film layer, an insulating film layer, a second oxidation-reduction reaction film layer and a second electrode laminated in this order. The improvement is characterized in that only one of the first and second oxidation-reduction film layers is patterned.

4 Claims, 2 Drawing Figures

ALL SOLID TYPE ELECTROCHROMIC DISPLAY ELEMENT

BACKGROUND OF THE INVENTION

1. Field of the Invention

The present invention relates to an all solid type electrochromic display element and its use.

2. Description of the Prior Art

In some particular substances such phenomenon can be observed that when a voltage is applied to the substance, an oxidation-reduction reaction takes place in it and the substance becomes reversibly colored or bleached. This phenomenon is called electrochromism in the art and substances which exhibit such phenomenon are called electrochromic materials.

For more than fifteen years, many attempts have been made to develop novel display elements using such electrochromic materials, and to use the novel display element for displaying numerals in clocks, watches or electronic calculators. Some attempts have resulted in developing such display elements which are able to repeat coloring and bleaching in response to the application to and removal from the element of voltages. For example, there is already known in the art such all solid type electrochromic display element comprising a transparent electrode film (cathode), a thin film layer of tungsten trioxide, an insulating film layer formed of, for example, silicon dioxide and a second electrode film (anode) arranged in that order on a glass substrate to form a multi-layer structure.

When a voltage is applied to the display element, the tungsten trioxide ($WO_3$) layer becomes colored blue. The blue color disappears when there is applied a voltage of a polarity opposite to that of the first applied voltage. The layer of $WO_3$ becomes again colorless. Although the mechanism of this coloring and bleaching phenomenon has not yet been fully ascertained, it has been known that a minor content of water in the $WO_3$ layer and the insulating layer plays a dominant role in coloring and bleaching of the $WO_3$ layer. It is likely that the coloring reaction proceeds as follows:

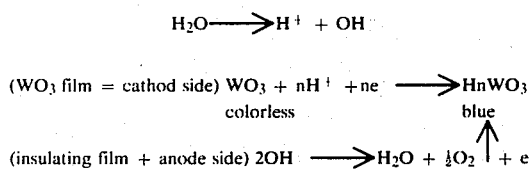

As seen from the above reaction formula, the known display element has the following drawbacks:

(1) The coloring reaction is accompanied with an unfavourable side reaction, that is, generation of oxygen gas, by which the water contained in the element is consumed.

(2) Since no water is produced during the bleaching reaction, the consumed water must be supplied from the atmosphere in order to repeat coloring. This brings forth another problem that the reproducibility of coloring in this type of display element is not stable but variable depending on the content of mositure in the atmosphere.

To overcome the above drawbacks there has recently been proposed a novel all solid type electrochromic display element which needs no supply of moisture from the atmosphere (cf. Japanese Patent Application Laid Open No. 73,749/1977). In this novel electrochromic display element, the same amount of water as consumed during the coloring reaction is produced by the following bleaching reaction. Therefore, it is possible to repeat coloring and bleaching without any external supply of water. Intensity of color developed in repeating the reaction remains always constant and is never affected by the moisture content in the atmosphere.

The known novel display element is basically composed of a transparent electrode layer, a thin film layer of electrolytic reduction electrochromic substance such as $WO_3$, a thin film layer of electrolytic oxidation electrochromic substance such as $Cr_2O_3$ and an opposite electrode layer laminated in that order.

In the above mentioned publication however, it is also disclosed that the color, once developed by an application of voltage on the display element, gradually disappears due to natural discharge after removing the voltage. According to the teachings made in the publication, this bleaching phenomenon may be excluded by providing a thin film layer of insultating substance such as silicon dioxide or magnesium fluoride. This insulating layer may be disposed in any layer position between the transparent electrode and the opposite electrode. The provision of such insulating layer gives the display element an ability to retain the color even after releasing the voltage (this ability is referred to as "memorability"). In other words, for this type of known display element it is essential to give it memorability by providing a particular insulating layer. We, the inventors of the present application, suppose that the insulating layer may allow proton ($H^+$) and hydroxyl ($OH^-$) ions to move freely through it although the layer is not a good conductor for electrons.

SUMMARY OF THE INVENTION

Through many inventive experiments on the all solid type electrochromic display element disclosed in the above mentioned Japanese Patent Application Laid Open No. 73,745/1977, we have found that it is most preferable to dispose the insulating film layer between the electrolytic reduction layer and the electrolytic oxidation layer and that it is not necessary for both of the latter mentioned two layers to be electrochromic. The result of our experiments has led us to the finding that if either of the two layers is able to change its color to such extent that the change in color is externally distinguishable, it is sufficient for the intended purpose.

Furthermore, we have found that a new effect is derivable from the solid type electrochromic display element disclosed in the above referred to publication by partly modifying its five layer structure comprising a transparent electrode, an electrolytic reduction electrochromic layer, an insulating layer which is a good proton conductor, an electrolytic oxidation electrochromic layer and an opposite electrode.

The experiments which have led us to the above finding are described hereinafter with reference to the accompanying drawings.

FIG. 1 is a schematic cross-sectional view of the five layer structure of the known all solid type electrochromic display element.

We modified the five layer structure by cutting off a portion of the electrolytic reduction layer or the electrolytic oxidation layer to form a five layer in part and four layer in part structure, as shown in FIG. 2 wherein the layer 2 is cut off leaving only the portions 2a and 2b.

A voltage was applied to the modified display element and the voltage level was gradually increased. In this experiment, there was observed such phenomenon that in the course of increasing the voltage, a color developed at first in the five layer portion of the element and some time after that the remaining four layer portion began to change in color. In conducting similar experiments we have found that there is a certain level of voltage at which only the five layer portion becomes colored while the four layer portion remains uncolored. Namely, it was found that, in the modified display element, it is possible to make only the five layer portion electrochromically colored by applying a suitably selected constant voltage to the element. Therefore, for the display element of such five layer in part and four layer in part structure, there is the possibility that characters such as A, B, C can be displayed on the element electrochromically if the five layer portion is arranged in the form of A, B, C. Obviously, this can be attained by patterning either of the two electrochromically reactive layers.

Accordingly, it is an object of the invention to provide an all solid type electrochromic display element comprising a first electrode, a first oxidation-reduction reaction film layer which is reversibly oxidation-reduction reactive, an insulating film layer formed of a good proton conductor, a second oxidation-reduction reaction film layer which is reversibly oxidation-reduction reactive and a second electrode, laminated in that order, wherein when one of the first and second oxidation-reduction reaction film layers is oxidized or reduced, the other is reduced or oxidized and at least one of said two layers is formed of an electrochromic material which is able to change in color when a voltage is applied thereto and wherein of said first and second electrodes at least one that is lying in contact with the electrochromic layer is transparent, and which display element is characterized in that only one of said first and second oxidation-reduction reaction layers is patterned.

It is another object of the invention to provide a method of using the above defined all solid type electrochromic display element, which method is characterized in that such level of voltage is applied to the element which is equal to or higher than the minimum voltage necessary for making only the patterned portion colored but lower than the minimum voltage necessary for making the remaining portion colored.

There has thus been outlined rather broadly the more important features of the invention in order that the detailed description thereof that follows may be better understood, and in order that the present contribution to the art may be better appreciated. There are, of course, additional features of the invention that will be described hereinafter and which will form the subject of the claims appended hereto. Those skilled in the art will appreciate that the conception upon which this disclosure is based may readily be utilized as a basis for the designing of other structures for carrying out the several purposes of the invention. It is important, therefore, that the claims be regarded as including such equivalent constructions as do not depart from the spirit and scope of the invention.

BRIEF DESCRIPTION OF DRAWINGS

Specific embodiments of the invention have been chosen for purposes of illustration and description, and are shown in the accompanying drawings, forming a part of the specifications wherein.

DESCRIPTION OF PREFERRED EMBODIMENTS

Figure 2:
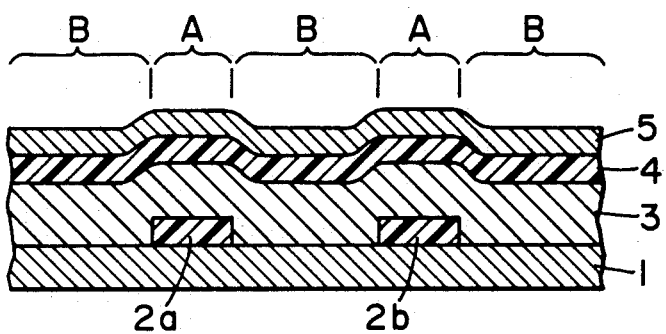
FIG. 2 is a similar view of an all solid type electrochromic display element showing an embodiment of the present invention in which the first oxidation-reduction reaction film layer is patterned.

Referring to FIG. 2, there is schematically shown the basic structure of an electrochromic display element according to the present invention.

In FIG. 2, a first electrode is designated by 1, a patterned first oxidation-reduction reaction film layer by 2a, 2b, an insulating layer by 3, a second oxidation-reduction reaction film layer by 4 and a second electrode is designated by 5.

The first electrode 1 is formed as a thin film layer the film thickness of which usually ranges from 0.01 to 0.5 $\mu$m. The insulating film layer 1 may be formed of NESA $SnLO_2$, indium oxide, copper iodide, gold or electroconductive resin. Since the first electrode 1 itself is very low in strength, it has to be formed on a suitable substrate serving as a supporting member. As the substrate there may be used glass-, plastic- or ceramic-plate, or a laminate prepared by coating a metal reflection layer at first and then a transparent insulating layer on the above plate. The substrate is not shown in FIG. 2. To form the first electrode 1 on the substrate, various techniques may be used such as vacuum deposition, sputtering, ion plating or the CVD method.

The first oxidation-reduction reaction layer is formed in the form of a selected pattern (2a), (2b) on the first electrode 1 employing a suitable known technique such a dry etching or liftoff. The film thickness of this patterned layer 2a, 2b is usually in the range of from 0.001 to several $\mu$m.

Material to be used for forming the above first oxidation-reduction reaction layer and material for forming the later described second oxidation-reduction reaction layer should be so selected as to satisfy the following requirement:

When one of the layers is formed of a substance is oxidized state, that is, a substance which is reducible by application of voltage, then the other layer must be formed of a substance in reduced state, that is, a substance which is oxidizable by application of voltage. On the contrary, if a substance in reduced state (namely, oxidizable by application of voltage) is selected for one of the two layers, then a substance in oxidized state (namely, reducible by application of voltage) must be selected for the other. Such substance which is white, light-colored or colorless and transparent in its stable state is preferred in view of the visual display.

If the first oxidation-reduction reaction layer is to be formed of a substance which is oxidized to develop color, then the substance may be selected from the following examples:

Iridium hydroxide, ruthenium hydroxide, rhodium hydroxide, nickel hydroxide and chromium hydroxide. Among them iridium hydroxide is particularly preferred.

The patterned first oxidation-reduction reaction layer (2a, 2b) is covered by a thin insulating layer 3 overlaid uniformly on the whole exposed surface of the substrate.

The insulating layer 3 is formed of such substance which is an insulator to electrons but acts as a good conductor to protons (H+) and hydroxyl (OH+) ions. Examples of such substances useful for forming the insulating layer 3 include tantalum oxide ($Ta_2O_5$), niobium oxide ($Nb_2O_5$), zirconium oxide ($ZrO_2$), titanium oxide ($TiO_2$), hafnium oxide ($HfO_2$), yttrium oxide ($Y_2O_3$), lanthanum oxide ($La_2O_3$), silicon oxide ($SiO_2$), magnesium fluoride, zirconium phosphate and mixtures thereof. Tantalum oxide is preferred.

Considering the memory time of display, the film thickness of the insulating layer 3 is selected from values ranging from 0.001 to 10 μm. To form the insualting layer 3 there may be used the known thin film forming techniques mentioned above.

On the insulating layer 3 the second oxidation-reduction reactive layer 4 is overlaid uniformly covering the whole surface of the insulating layer 3. The known thin film forming techniques mentioned above can be used for forming the second layer 4. As previously noted, the selection of material to be used for the second layer 4 depends upon the selection of material for the first layer 2a, 2b. If the second layer is to be formed of a substance which is reducible by application of voltage, then the substance may be selected, for example, from the group consisting of tungsten oxide ($WO_3$), molybdenum oxide ($MoO_3$) and mixtures thereof. Among them particularly preferred is tungsten oxide. The second reactive layer 4 has a film thickness in the range of from 0.001 to several μm.

Lastly, the second electrode 5 is formed employing any one of the above mentioned known thin film forming techniques and covering uniformly the whole surface of the underlying second reactive layer 4. Generally, the second electrode 5 is 0.05 to 5 μm in film thickness.

In this manner, a display element according to the invention is prepared. As seen in FIG. 2, the display element has, at its display portion A, a five layer structure comprising the first electrode 1, first oxidation-reduction reaction layer 2a, 2b, insulating layer 3, second oxidation-reduction reaction layer 4 and second electrode 5 arranged in that order. At the non-display portion B, the display element has a four layer structure comprising the first electrode 1, insulating layer 3, second oxidation-reduction reaction layer 4 and second electrode 5 arranged in that order.

Since the multilayer structure element is used as a display element, at least one of the first and second electrodes lying in contact with the oxidation-reduction reaction layer of electrochromic substance must be transparent. Of course, other layer(s) than the transparent electrode may be transparent. This is a matter to be determined depending upon the type of display element then desired. For example, in the case of a transmission type display element, all of the layers 1 to 5 are required to be transparent before or after application of voltage or after application of an opposite voltage. For a reflection type display element, the multilayer structure must be designed as follows:

When the electrode lying on the display side is, for example, the second electrode 5, then (1) the second oxidation-reduction reaction layer 4 should be electrochromic or (2) both of the second reaction layer 4 and the insulating layer 3 should be transparent and the first reaction layer 2a, 2b should be electrochromic.

As for the connection of the first and second electrodes to the cathode and anode of an external power source, the electrode in contact with the reaction layer reducible by applicable of voltage has to be connected to the anode of the external power source.

When a voltage is applied to the display element of the invention, a reaction takes place at the display portion A of the element. More particularly, the first oxidation-reduction reaction layer 2a, 2b reacts to the applied voltage and at the same time only the areas of the second reaction layer 4 facing the first layer 2a, 2b react to it. Since, in the display element according to the present invention, either of the two reaction layers is formed of such substance which electrochemically changes in color, a desired pattern can be displayed on the element by applying a voltage in this manner. At this time the voltage is applied, the non-display portion B remains unchanged in color. This may be contrary to the common knowledge in the art because the insulating layer 3 and the second reaction layer 4 exist also in the non-display portion B and between the first and second electrodes 1 and 5. Therefore, it may be considered that when a voltage is applied to the display element, the same reaction as in the display portion A must take place also in the non-display portion B resulting in change in color also at the non-display portion B. However, as previously noted, the voltage level required to cause the non-display portion B to change color is far higher than that required to cause the display portion A to change color. Therefore, by suitably selecting the level of voltage to be applied to the display element according to the invention, it is possible to cause only the display portion A to change color while keeping the second reaction layer 4 at the non-display portion B in the state unreacted to the application of voltage and therefore unchanged in color.

After cutting off the power source, the colored pattern, once displayed, is kept in memory for a long time. To return the element from the electrochromatically reacted state to the original state, the first and second electrodes 1 and 5 are short-circuited or a voltage of opposite polarity to that previously applied is applied to the electrodes 1 and 5.

While in the above embodiment the first oxidation-reduction reaction layer has been shown and described to be a patterned layer, the second reaction layer may be patterned similarly. In either case, the display element according to the invention exhibits the same effect. There is no essential difference in structure between the two cases. It depends solely on the type of display element then desired which reaction layer should be patterned. As for patterning, it is recommendable that normally the pattern be invisible from the outside of the display element unless voltage is applied thereto.

Figure 1:
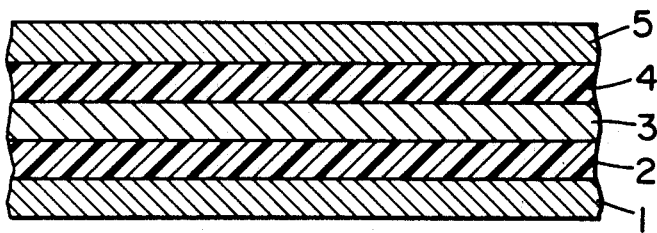
FIG. 1 is a schematic cross-sectional view of an all solid type electrochromic display element according to the prior art.

In the above referred publication, Japanese Patent Application Laid Open No. 73,745/1977 it was said that by patterning either of the two electrodes of the five layer structure shown in FIG. 1 there was obtained a display element capable of pattern display. However, patterning of electrodes involves many disadvantages. Firstly, the individual segment electrodes must be connected with the corresponding individual lead wires or the individual segment electrodes must be interconnected by lead wires. Secondly, the manufacturing process is complicated because of the above wiring, therefore the manufacturing cost rises. Lastly, since the lead wire portions also act as electrode, the configuration of the lead wire portions is undesirably displayed together with the real display portions.

The display element according to the invention eliminates the above disadvantages. According to the invention, patterning of the electrode is no longer necessary. When only one of the first and second oxidation-reduction reaction layers is patterned, the display element according to the invention can display an image of the pattern. Thus, all the problems involved in the use of segment electrodes are successfully solved by the present invention.

For the display element according to the invention, displaying and erasing of the pattern image can be controlled freely by means of the electric signal. Therefore, the display element has many applications. For example, it may be used for displaying a warning mark within the finder of a camera or in the instrument panel of a car and also for advertising displays.

The following examples illustrate the present invention.

EXAMPLE 1

On a transparent electrode film supported on a glass plate there was formed a metal iridium thin film layer of 0.01 μm in film thickness. The transparent electrode film was previously formed of ITO (indium oxide admixed with a small amount of tin oxide) and its film thickness was 0.15 μm. The iridium layer was formed employing the vacuum deposition process (vacuum: $1 \sim 5 \times 10^{-5}$ Torr; deposition rate 0.001 μm/sec.).

Then the iridium layer was coated with photo resist and a pattern was printed and developed so as to leave the photo resist only on a desired display pattern portion. At the non-display portion where no photo resist film remained, the exposed metal iridium layer was removed by dry etching. After removing, the photo resist remained on the display portion (pattern portion) by washing in oxygen gas, the metal iridium layer (display portion) was subjected to electrolytic oxidation in 1 N aqueous solution of sulfuric acid to change the metal iridium layer into a transparent iridium hydroxide layer.

After completing the formation of the iridium hydroxide patterned layer, a transparent film layer of tantalum pentoxide was formed covering the whole exposed surface of the layer including the pattern previously formed on the glass plate. The tantalum pentoxide layer was 0.25 μm in film thickness and was formed employing the vacuum deposition process (vacuum: $1 \sim 2 \times 10^{-4}$ Torr; deposition rates: $2 \sim 3 \times 10^{-4}$ μm/sec.).

On the tantalum pentoxide layer there was formed a transparent tungsten trioxide film layer of 0.25 μm in film thickness employing the vacuum deposition process (vacuum: $1 \sim 2 \times 10^{-4}$ Torr; deposition rate: $5 \sim 10 \times 10^{-4}$ m/sec.).

Lastly, as an opposite electrode, a transparent indium oxide film of 0.12 μm thick was formed by vacuum deposition on the above layer. Thus, an all solid electrochromic display element according to the invention was prepared.

Of the two electrodes of the display element, one electrode, in contact with the tungsten trioxide layer, was connected to the cathode of an external power source and the other electrode, in contact with the iridium hydroxide patterned layer, was connected to the anode of the power source.

When a voltage of 1.4 V was applied to the display element, the display portion (corresponding to the pattern of iridium hydroxide) was colored in blue at 100 msec. after the application of voltage. The contrast ratio of the display portion before and after coloring was measured to be 1:3. When an opposite voltage of 1.4 V was applied to the display element, the blue pattern disappeared at 50 msec. after the application of the opposite voltage and the display element again became transparent.

When a voltage of 1.6 V was applied to the display element, both the display portion (pattern portion) and the non-display portion were colored in blue and the contrast ratio between the two portions was very small.

EXAMPLE 2

On a 0.15 μm thick transparent electrode film (ITO) supported on a glass plate there was formed a metal iridium film layer of 0.01 μm thick by vacuum deposition (vacuum: $1 \sim 5 \times 10^{-5}$ Torr; deposition rate: $10 \times 10^{-4}$ μm/sec.). The metal iridium layer was subjected to electrolytic oxidation in 1 N aqueous sulfuric acid solution to change it into a transparent iridium hydroxide layer.

On the iridium hydroxide layer, thereafter, a tantalum pentoxide film layer of 0.25 in thickness was formed by vacuum deposition (vacuum: $1 \sim 2 \times 10^{-4}$ Torr; deposition rate: $2 \sim 3 \times 10^{-4}$ μm/sec.). On the tantalum pentoxide layer there was formed a transparent tungsten trioxide layer of 0.25 μm in thickness by vacuum deposition (vacuum: $1 \sim 2 \times 10^{-4}$ Torr; deposition rate: $5 \sim 10 \times 10^{-4}$ μm/sec.). The tungsten trioxide film layer thus formed was then patterned into a desired pattern by employing a known photographic etching technique.

Lastly, transparent indium oxide was deposited on the whole surface of the laminate previously formed on the glass plate to form an opposite electrode film of 0.12 μm in thickness.

The all solid type electrochromic display element thus prepared in accordance with the invention was tested by applying a voltage in the same manner as in Example 1. The result was similar to that in Example 1.

EXAMPLE 3

Example 1 was repeated with the exception that ruthenium was used in place of iridium. A display element comparable to that in Example 1 was prepared.

EXAMPLE 4

Example 1 was repeated with the exception that rhodium was used in place of iridium and 1 N aqueous sulfuric acid solution was replaced by an aqueous sodium hydroxide solution. A display element comparable to that in Example 1 was prepared.

EXAMPLE 5

On a transparent electrode film (ITO) 0.15 μm thick supported on a glass plate there was formed a nickel hydroxide layer of 0.12 μm thick by vacuum deposition (vacuum: $1 \sim 2 \times 10^{-4}$ Torr; deposition rate: $2 \sim 3 \times 10^{-4}$ μm/sec.). The nickel hydroxide layer was then patterned in a desired form by photographic etching. Subsequent steps were carried out in the same manner as in Example 1 to form a tantalum pentoxide layer, a tungsten trioxide layer and an opposite electrode layer (indium oxide) one on the other sequentially. Thus, an all solid type electrochromic display element was prepared in accordance with the invention.

A voltage of about 1.3 V was applied between the two electrodes of the display element. 150 msec. after the application of voltage, the display portion corresponding to the pattern of nickel hydroxide was colored in dark grey. The contrast ratio of before and after coloring was about 1:2. Thereafter, an opposite voltage of about 1.3 V was applied to the display element. The dark grey color disappeared and the display element became transparent. The pattern was no longer visible externally.

EXAMPLE 6

Example 1 was repeated with the exception that molybdenum trioxide was used instead of tungsten trioxide. A display element was obtained which showed the same degree of performance as that of Example 1.

We believe that the construction and use of our novel display element will now be understood and that the several advantages thereof will be fully appreciated by those persons skilled in the art.

We claim:

1. An all solid type electrochromic display element comprising a first electrode, a first oxidation-reduction reaction layer which is reversibly oxidation-reduction reactive, a transparent insulating layer which is a good proton conductor, a second oxidation-reduction reaction layer which is reversibly oxidation-reduction reactive and a second electrode, laminated in that order, wherein when one of said first and second oxidation-reduction reaction layers is oxidized, the other is reduced, said two layers being formed of an electrochromic material which is able to change in color when a voltage is applied thereto and wherein at least one of said first and second electrodes is transparent, and characterized in that (a) the only patterned layer being one of said first and second oxidation-reduction reaction layers which is patterned in the form of figure to be displayed;

(b) a voltage level equal to or more than a minimum voltage required for causing the change in color at a portion corresponding to the figure to be displayed out of patterned reaction layer and non-patterned reaction layer, the voltage level being lower than a minimum voltage needed for causing the change in color of the whole of the patterned reaction layer and non-patterned reaction layer, is applied between said first and second electrodes.

2. A display element as set forth in claim 1, which is characterized in that both said first and second oxidation-reduction reaction layers are normally colorless and transparent.

3. A display element as set forth in claim 2, which is characterized in that said first oxidation-reduction reaction layer is reduced to be colored by application of a voltage thereto and the second one is oxidized to be colored by application of a voltage thereto and that said second oxidation-reduction reaction layer is patterned in the form of a figure to be displayed.

4. A display element as set forth in claim 3, which is characterized in that said first oxidation-reduction reaction layer is formed of at least one substance selected from the group consisting of tungsten oxide ($WO_3$) and molybdenum oxide ($MoO_3$) and said second oxidation-reduction reaction layer is formed of at least one substance selected from the group consisting of iridium hydroxide, ruthenium hydroxide, rhodium hydroxide, nickel hydroxide and chromium hydroxide and that said insulating layer is formed of at least one substance selected from the group consisting of tantalum oxide ($Ta_2O_5$), niobium oxide ($Nb_2O_5$), zirconium oxide ($ZrO_2$), titanium oxide ($TiO_2$), hafnium oxide ($HfO_2$), yttrium oxide ($Y_2O_3$), lanthanum oxide ($La_2O_3$), silicon oxide ($SiO_2$), magnesium fluoride ($MgF_2$) and zirconium phosphate ($ZrO(H_2PO_4)_2 \cdot H_2O$).

* * * * *

UNITED STATES PATENT AND TRADEMARK OFFICE
CERTIFICATE OF CORRECTION

PATENT NO. : 4,433,901

DATED : February 28, 1984

INVENTOR(S) : YOSUKE TAKAHASHI, ET AL.

It is certified that error appears in the above-identified patent and that said Letters Patent is hereby corrected as shown below:

Column 4, line 22, change "$SnLO_2$" to --$SnO_2$--.

Signed and Sealed this

Third Day of July 1984

[SEAL]

Attest:

GERALD J. MOSSINGHOFF

Attesting Officer

Commissioner of Patents and Trademarks